UNITED STATES PATENT OFFICE.

HENRY L. STAFFORD, OF LONG BEACH, CALIFORNIA.

METHOD OF PREPARING SMOKED FISH FOR CANNING.

1,174,635. Specification of Letters Patent. Patented Mar. 7, 1916.

No Drawing. Application filed April 19, 1915. Serial No. 22,355.

*To all whom it may concern:*

Be it known that I, HENRY L. STAFFORD, a citizen of the United States, residing at Long Beach, in the county of Los Angeles and State of California, have invented a new and useful Method of Preparing Smoked Fish for Canning, of which the following is a specification.

Heretofore in the preparation of smoked or kippered fish, and particularly those of the tunny species, white meat only has been used, the dark meat, fat parts, bellies and other edible parts being thrown away.

It is the object of this invention to provide a food product in which the dark meat, fat parts, bellies and other edible parts are used with the white meat.

In carrying out the process of preparing my food product I first steam or cook the fish and then remove the bones, skins, fins and other unedible parts, leaving the dark and white meats, fat parts, bellies and other edible parts, to which I add salt and other suitable seasoning, such as spices. Suitable oil is next added and following this I thoroughly mix a binder of a starchy or gelatinous nature, such as flour, starch or other material having coagulative tendencies, with the fish parts and matter added thereto, to form a plastic mass which is capable of being agglomerated. The binder may be thoroughly mixed with the fish by grinding the fish and binder or by some other method and the fish may be separated into small parts in any suitable manner or very finely divided if desired prior to the mixture thereof with the binder. I do not wish to limit myself to any particular manner of grinding or mixing the fish parts with the binder, but it is required that this binder be mixed with the fish in such a manner that a doughy mixture is provided. I next place this doughy mixture in a preferably porous tube or casing, which is constructed of muslin or some other similar material and then suspend the tube or casing over a smoking fire or otherwise heat the tubing so as to cause the binder to agglutinate with the other ingredients and the mixture to be molded. I next remove the tube or casing from the molded mixture, or vice versa, and smoke the molded mixture over a smoking fire for a desired length of time. The tube or casing is preferably of slightly less inside diameter than the inside diameter of the cans or receptacles into which the food product is to be packed, thus, the product after having been molded and smoked may be cut into suitable lengths and placed into the cans or receptacles in which they are packed. The cut portions of the product are preferably dipped in oil prior to being placed in the cans or receptacles in order to aid preserving of the product and to prevent it from sticking to the receptacle which is usually heated. Fish prepared in accordance with the foregoing has been found to be extremely palatable and nutritious.

I claim:

1. The process of preparing a smoked fish product which consists in cooking the fish, removing the bones and other unedible parts, adding seasoning to the edible fish, mixing the edible fish and the seasoning with a binder, suitably shaping the mixture within a porous container, heating the mixture while in the container to mold it, and then subjecting the molded mixture after being removed from the container to heated smoke.

2. The process of preparing a smoked fish product which consists in cooking the fish, removing the bones and other unedible parts, adding seasoning to the edible fish, mixing the edible fish and the seasoning with a binder, suitably shaping the mixture by placing it within a porous container, heating the mixture to mold it, subjecting the molded mixture to heated smoke, and then dividing the smoked and molded mixture into parts to be packed.

3. The process of preparing a smoked fish product which consists in cooking the fish, removing the bones and other unedible parts, adding seasoning to the edible fish, mixing the edible fish and the seasoning with a binder, suitably shaping the mixture, by placing it within a porous container, smoking the mixture while in the porous container, subjecting the molded mixture to heated smoke, then dividing the smoked and molded mixture into parts to be packed, and then dipping the smoked and molded divided parts into oil.

4. The process of preparing a smoked fish product which consists in cooking the fish, removing the unedible parts, adding suitable seasoning to the edible fish, mixing a binder with the seasoning and the edible fish, placing the mixture in a porous container to mold the mixture, heating the container, removing the container from the molded mixture and then smoking the molded mixture.

5. The process of preparing a smoked fish product which consists in cooking the fish, removing the unedible parts, adding suitable seasoning to the edible fish, thoroughly mixing a binder with the seasoning and the edible fish to provide a doughy mixture of seasoned fish and binder, placing the mixture in a porous container to mold the mixture, heating the container, removing the container from the molded mixture, then smoking the molded mixture, and then dividing the molded mixture into smaller parts.

6. The process of preparing a smoked fish product which consists in cooking the fish, removing the unedible parts, adding suitable seasoning to the edible fish, mixing a binder with the seasoning and the edible fish, placing the mixture in a porous container to mold the mixture, heating the container, removing the container from the molded mixture, then smoking the molded mixture, dividing the molded mixture into smaller parts, and then dipping the divided parts into oil.

7. The process of producing a smoked fish food product which consist in cooking the fish, removing the bones and other unedible parts from the fish, adding suitable seasoning to the edible fish parts, thoroughly mixing the edible fish parts and seasoning with a binder, then molding the mixture into a definite shape and smoking it by placing the mixture within a porous container of definite shape and then smoking the mixture while in the container.

8. The process of preparing a smoked fish product which consists in cooking the fish, removing the bones and other unedible parts of the fish, adding seasoning to the edible parts, mixing the fish and seasoning with a binder, molding the mixture by placing it in a porous container, smoking the container and then subjecting the molded mixture to smoke after being removed from the container.

9. The process of preparing a fish food which consists in cooking the fish, removing the unedible parts from the edible parts thereof, adding seasoning and a doughy binder to the edible fish parts, placing the mixture of seasoning, fish parts and binder within a porous container of a definite shape and then subjecting the container to smoke thereby molding and smoking the mixture while in the container.

In testimony whereof, I have hereunto set my hand at Los Angeles, California, this 8th day of April, 1915.

HENRY L. STAFFORD.

In presence of—
L. BELLE WEAVER,
LORA M. BOWERS.

Copies of this patent may be obtained for five cents each, by addressing the "Commissioner of Patents, Washington, D. C."